United States Patent [19]

Schultz

[11] Patent Number: 4,561,208
[45] Date of Patent: Dec. 31, 1985

[54] MODULAR PLANTER SYSTEM

[76] Inventor: John R. Schultz, 1046 S. Park Acres, Batesville, Ind. 47006

[21] Appl. No.: 447,407

[22] Filed: Dec. 6, 1982

[51] Int. Cl.⁴ .............................................. A01G 9/02
[52] U.S. Cl. ....................................... 47/83; 211/194; 211/189; 47/39; 47/67
[58] Field of Search .................... 47/70, 82, 83, 39, 86, 47/81, 67, 66; 248/27.8, 150; 211/182, 194, 189, 128, 133

[56] References Cited

U.S. PATENT DOCUMENTS

| 3,030,735 | 4/1962 | Bodkins | 47/83 X |
| 3,076,289 | 2/1963 | Gallo | 47/83 |
| 3,879,889 | 4/1975 | Schmid | 47/81 |
| 4,355,485 | 10/1982 | Frank | 47/82 |

FOREIGN PATENT DOCUMENTS

| 2540038 | 4/1977 | Fed. Rep. of Germany | 47/83 |
| 2390088 | 1/1979 | France | 47/83 |
| 1214837 | 12/1970 | United Kingdom | 47/83 |

Primary Examiner—Robert A. Hafer
Assistant Examiner—Danton D. DeMille
Attorney, Agent, or Firm—Woodard, Weikart, Emhardt & Naughton

[57] ABSTRACT

There is provided a modular planter system for forming an endless variety of horizontal, vertical and spatial arrangements. The modular planter system includes three or more pot housings each capable of receiving a plant pot. One or more connecting members are attached to each of the pot housings at a plurality of radially spaced-apart locations. The connecting members mate together vertically in order to permit the interconnection of the pot housings in various angular orientations. The pot housings have hollow interiors to permit them to be filled with water and provide water to plants received within the housings by means of a wick. At least one of the pot housings may alternatively be adapted to receive a light fixture to provide the planter system a source of artificial light. The system is supported by a variety of external support means including a floor support base, an adjustable length pole and a ceiling-mounted chain.

4 Claims, 14 Drawing Figures

MODULAR PLANTER SYSTEM

BACKGROUND OF THE INVENTION

The present invention relates to planter systems for plants and, more particularly, to modular planter systems.

In many homes and offices, plants may be found displayed in groupings and supported by a variety of devices suited for this purpose, such as poles, plant hangers, plant stands, etc. Since it is desirable for a number of aesthetic and functional reasons to be able to rearrange, replace and otherwise alter displays of plants, it is easily seen that plant fixtures capable of providing a variety of spatial arrangements are particularly useful. As a result, there are several advantages afforded by a modular planter system in which each plant is individually retained within interconnectable modules. With a modular planter system it is possible for an individual to start with only a few or even one module and add to the system as desired. A modular system also allows considerable flexibility in arrangements so as to take advantage of available lighting and space requirements.

There have been many types of modular plant display devices reported in the literature. The following is a list of references which disclose examples of such devices:

| U.S. Pat. No. | Patentee |
| --- | --- |
| 3,018,898 | Frazelle |
| 3,194,403 | Van Horn |
| 3,611,633 | Shackelford |
| 3,747,268 | Linder |
| 3,991,686 | Mechachonis |
| 3,935,671 | Soot |
| 4,083,457 | Dromboski |
| 4,151,680 | Sena |
| 4,161,085 | Moffett |
| 4,262,467 | Faisant et al. |

The Frazelle reference discloses a portable bracket pole which may be rigidly positioned to support a plurality of interchangeable bracket units. This device, however, inherently limits the spatial arrangements possible because each plant must be separately attached to a common vertical pole. Further, the Frazelle device does not provide for the individual movement of brackets relative to each other. Thus, in order to face certain plants toward or away from a light source, or to rearrange the spatial arrangement for any other functional or aesthetic purpose, it would be necessary to remove the brackets corresponding to the plants for which rearrangement is desired from their mounting holes and then reinsert the brackets in the desired holes. Another disadvantage of this device is that the number of plant pots and arrangements is limited by the fixed number of mounting holes.

The Linder reference discloses a sectional semi-circular planter which permits the planters to be mounted at any selected vertical elevation on a vertical post. The number of spatial arrangements is still severely limited since the plant pots must be vertically arranged on a common axis.

The Faisant et al. reference discloses a modular element suitable for flower boxes in which each module may be assembled with other similar elements either by juxtaposition in a single plane or in offset planes, or by superposition with angular displacement. While the number of modules is unlimited, spatial arrangements are restricted to assemblies forming a network of lines forming an angle of 60° with each other. Further, the modules cannot be individually rotated.

The Sena reference discloses a modular horticultural structure and container system which permits a variety of of horizontal and vertical displays and arrangements. Spatial arrangements are still restricted by the interlocking design and individual rotation of interconnected modules is not possible.

The Van Horn and Mechachonis references disclose display or support stands which allow for the rotation of articles supported by the stands. One embodiment disclosed in the Van Horn reference does apparently allow a tray to be rotated on a first vertical axis and also rotated about a second vertical axis, but is otherwise different from the present invention. The Mechachonis patent discloses a multi-level plant display stand in which pairs of plants are supported by brackets which are individually rotatable on a common vertical support post. The support post is assembled from a number of tubular socket parts which are joined end to end. However, the socket parts are not directly attached to any plant housing elements, and spatial arrangements are therefore severely restricted. Further, rotation is possible about only one vertical axis.

The remaining references disclose various devices for forming plant or flower arrangements.

While each of the patents referred to above discloses a device claiming to have certain benefits with regard to the display or support of plants, none of these devices affords the advantages accomplished in the present invention.

SUMMARY OF THE INVENTION

One embodiment of the present invention provides a modular planter system having three or more interconnecting modules. Each module interconnects with other similar modules at various angles to provide for an endless variety of horizontal, vertical and spatial arrangements. Each module includes a pot housing having an open top capable of receiving therein a plant pot. There is further provided for each module at least one connecting member attached to the pot housing at a plurality of spaced apart locations. The connecting members connect to each other vertically so that the modules of the system are interconnected along a plurality of vertical axes. The pot housings of any two connected modules may be independently selected and varied in any desired radial orientation about a vertical axis extending through the center of connection of their mated connecting members. The system also includes a support means connected to the modules.

It is an object of the present invention to provide an improved modular planter system.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
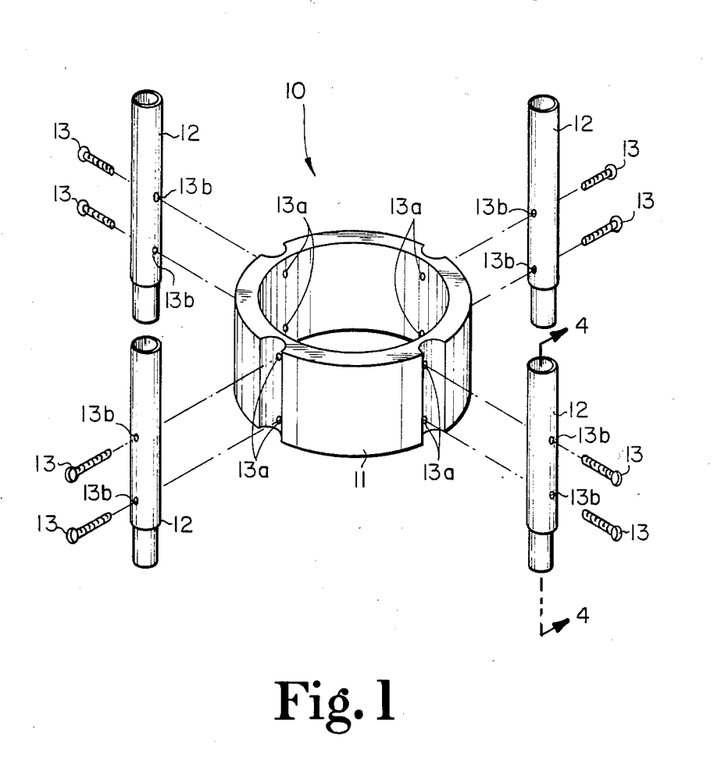
FIG. 1 is an exploded perspective view showing the assembly of the planter module of the present invention.

Referring now to the drawings, and particularly to FIG. 1, there is shown a planter module 10 comprising pot housing 11 and four identically formed connecting members 12 in an exploded perspective view. Each connecting member receives a pair of screws 13 through apertures 13b. Screws 13 then firmly secure the connecting members 12 to pot housing 11 through threaded apertures 13a. While pot housing 11 may have attached thereto as many as four connecting members, it is to be understood that the number of connecting members attached to pot housing 11 will vary, depending upon the desired spatial arrangement. Thus, planter module 10 may alternatively comprise a pot housing and one, two, three or four connecting members.

Figure 2:
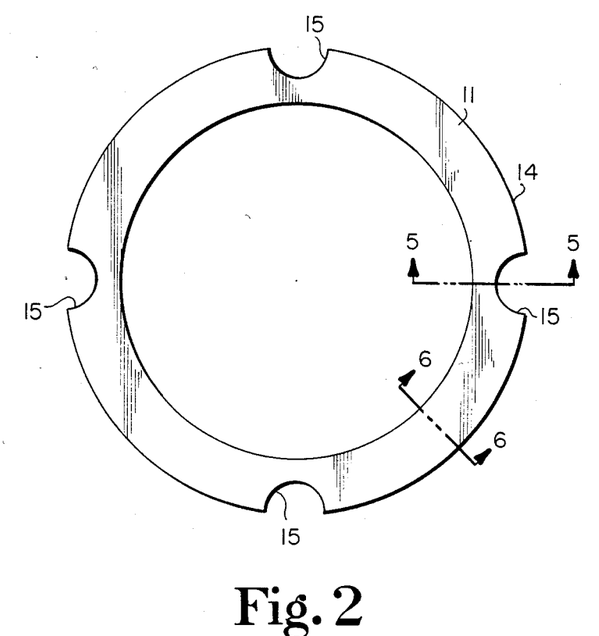
FIG. 2 is a top view of the preferred embodiment of the pot housing of the present invention.
Figure 3:
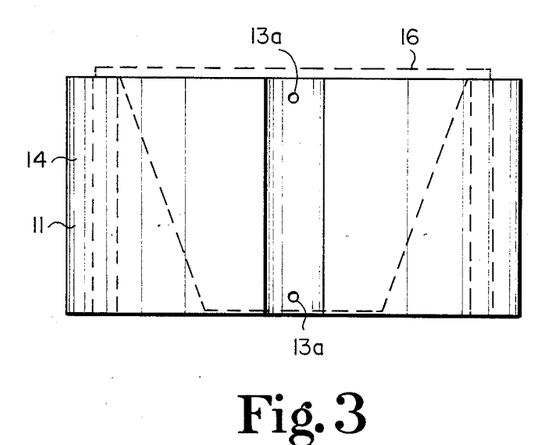
FIG. 3 is an elevation view of the pot housing of FIG. 2 with a conventional plant pot shown in dashed lines received within the pot housing.

FIG. 2 is a top view of the preferred embodiment of pot housing 11 while FIG. 3 shows the preferred embodiment of pot housing 11 in an elevational view. Pot housing 11 has an open top and bottom and an exterior surface 14 which defines a series of four equally radially spaced vertical grooves or recesses 15 which serve to receive connecting members 12. Recesses 15 have an annular shape which conforms closely to the external surface of connecting members 12. Thus, while recesses 15 serve the aesthetic purpose of enhancing the appearance of the assembled planter modules, they also aid in providing attachment for pot housing 11 to connecting members 12. Further, it should be understood that although the preferred embodiment of pot housing 11 allows for the connection of four connecting members, alternative embodiments permitting a greater or lesser number of radial connection points could also be provided. Equal radial spacing between recesses 15 is also not required, but it does permit maximum space between pot housings in addition to providing a pleasing aesthetic appearance.

A conventional plant pot 16 which may, for example, be an inexpensive plastic injection molded pot is shown in dashed lines and received within pot housing 11. It is to be noted that pot housing 11 may be formed in various sizes to receive differently sized pots, so long as the recesses 15 are sized to receive connecting members 12, which have one standard size. Thus, the present invention allows a modular planter system to be assembled from differently sized modules.

It should also be noted that pot housing 11 could alternatively have an enclosed bottom in order to directly receive therein a plant. There are, however, distinct advantages to a modular design having a pot and a separate pot housing. If the plant is contained in a pot separate from pot housing 11, the plant pot may be easily turned within the pot housing if it is desired for such reason as facing different portions of the plant toward a source of light. Also, plants may be rearranged within a particular system or removed therefrom without disconnecting any modules or pot housings.

Figure 4:
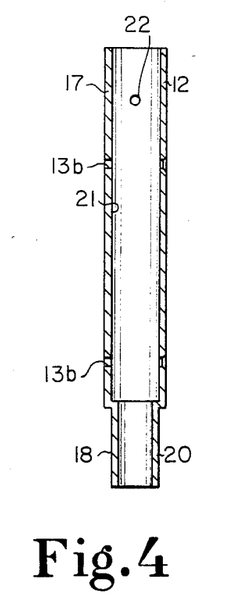
FIG. 4 is a section view of the connecting member of the present invention taken on line 4—4 in FIG. 1.

FIG. 4 shows a connecting member 12 in a section view. Male end 18, which may alternatively be termed a ferrule, has an annular external surface 20 and female end 17 has an annular inner surface 21 which are complimentarily sized to allow the male end 18 of one connecting member to mate inside the female end 17 of another similarly formed connecting member. Any desired number of connecting members 12 may thus be vertically mated for building multi-level spatial arrangements. It is to be noted that while there exists a friction fit between male end 18 and female end 17, the fit is such that mated connecting members may be individually rotated. Thus, aperture 22 receives a set screw 23 (FIG. 7) in order to securely lock mated connecting members together and to ensure that the attached pot housings are fixed in a desired angular relationship. It should also be seen that the connecting members 12 may alternatively be interconnected by any other conventionally known and suitable connection means, such as mating threads, spring clip fasteners, etc.

Figure 5:
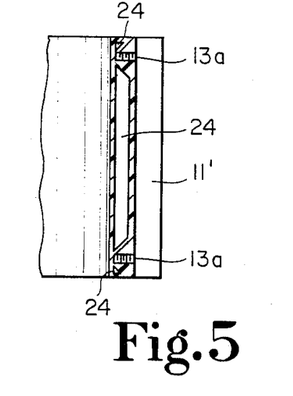
FIG. 5 is a section view of an alternative embodiment of the pot housing of the present invention taken on line 5—5 in FIG. 3.
Figure 6:
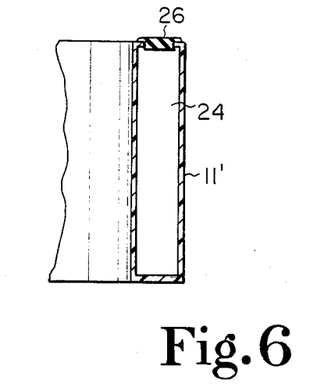
FIG. 6 is a section view of the alternate embodiment depicted in FIG. 5 taken on line 6—6 in FIG. 3.

Referring now to FIGS. 5 and 6, sections of an alternative preferred embodiment of pot housing 11 are shown designated as 11'. Pot housing 11' which is otherwise similar to pot housing 11 is modified to have a hollow interior 24 which serves as a water reservoir for watering plants received in pot housing 11'. Pot housing 11' may be formed in any well known manner as, for example, injection molded plastic. In a manner known in the art, a conventional type wick is used to provide a continuous water supply by capillary action to a plant received within pot housing 11'. One end of the wick is inserted in the reservoir after opening sealer cap 26, and the other end of the wick is buried in the soil within the pot. Thus, individual pot housings within an interconnected modular system provide both a display platform and a water reservoir for plants received therein.

Figure 7:
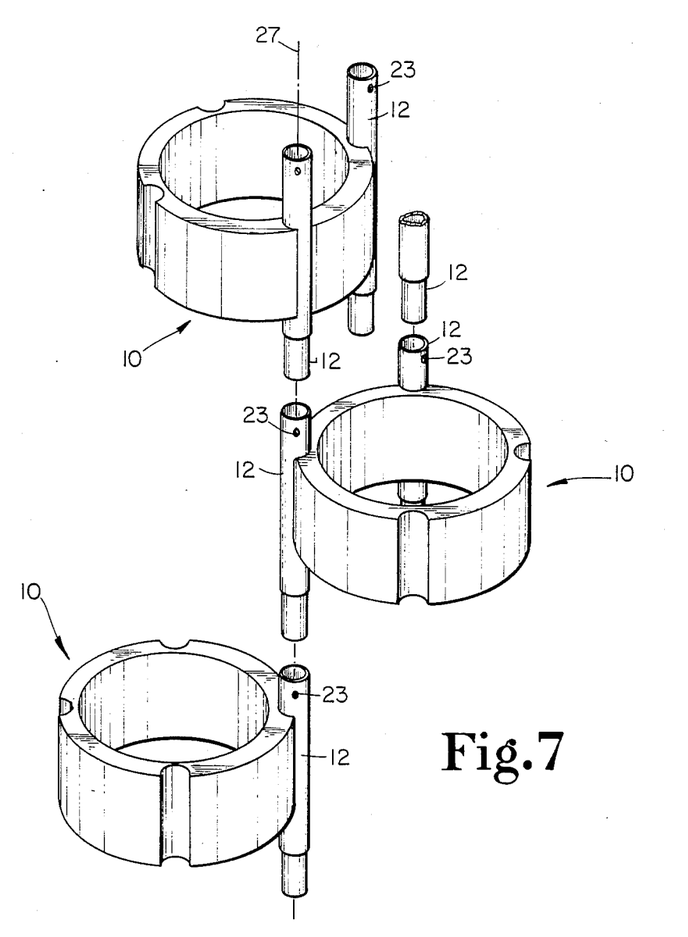
FIG. 7 is an exploded perspective view of the planter modules of the present invention illustrative of the connection between planter modules to form the modular planter system of the present invention.

FIG. 7 illustrates in a perspective view how the modules 10 are interconnected. Connecting members 12 are attached as needed to each pot housing 11. Each module 10 is then directly connected to at least one other module by mating one or more connecting members 12. It is easily seen that when connecting members 12 are mated they attach on a vertical axis, such as axis 27. In this manner, any number of modules similar to module 10 may be interconnected by connecting members 12 aligned on any number of vertical axes. It is also seen that connecting members 12 may be interconnected such that the attached pot housings 11 are oriented radially in any desired direction to axis 27. Once the pot housings 11 are thus arranged, set screws 23 are tightened to lock the pot housings 11 in their desired positions. It may also be appreciated that by untightening the necessary screws 23 the radial orientation of each of the pot housings 11 may be independently varied.

Figure 8:
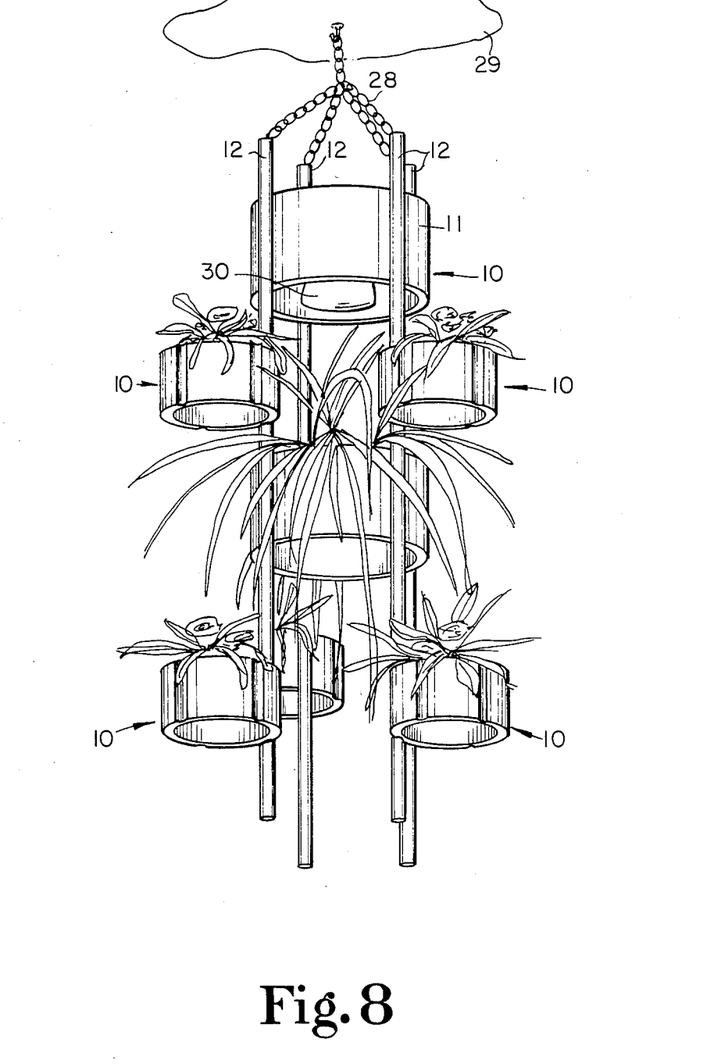
FIG. 8 is a perspective view illustrative of the planter module system of the present invention suspended from a ceiling by a chain and including a standard light fixture.

In the embodiment shown in FIG. 8, a number of planter modules 10 are interconnected to form an illustrative multi-level spatial arrangement. Chain 28 is attached to connecting members 12 and is suspended from ceiling 29. While it is readily seen that in this embodiment the spatial arrangement must be such that the load on chain 28 is properly balanced, additional chains could easily be attached as necessary in order to achieve any desired spatial arrangement. One of the pot housings 11 is shown receiving a standard electrical light fixture 30. Thus, the modular planter system of the present invention may contain one or more modules which provide artificial light to plants within the system in order to satisfy lighting requirements for certain plants or for display purposes.

Figure 9:
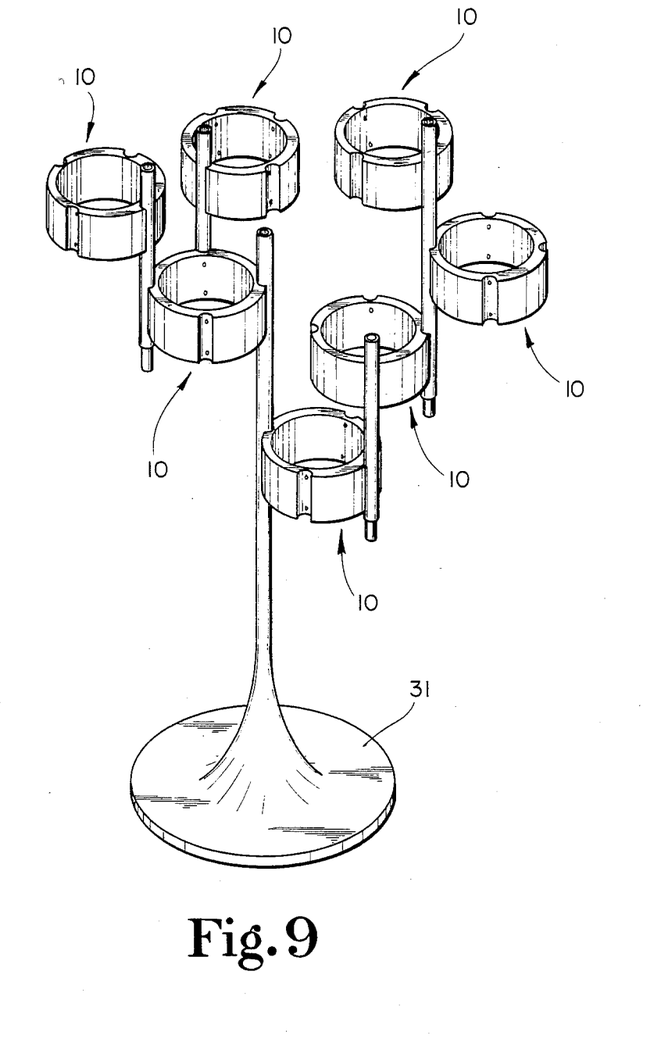
FIG. 9 is a perspective view illustrating an embodiment of the planter module system of the present invention including a floor support base.
Figure 10:
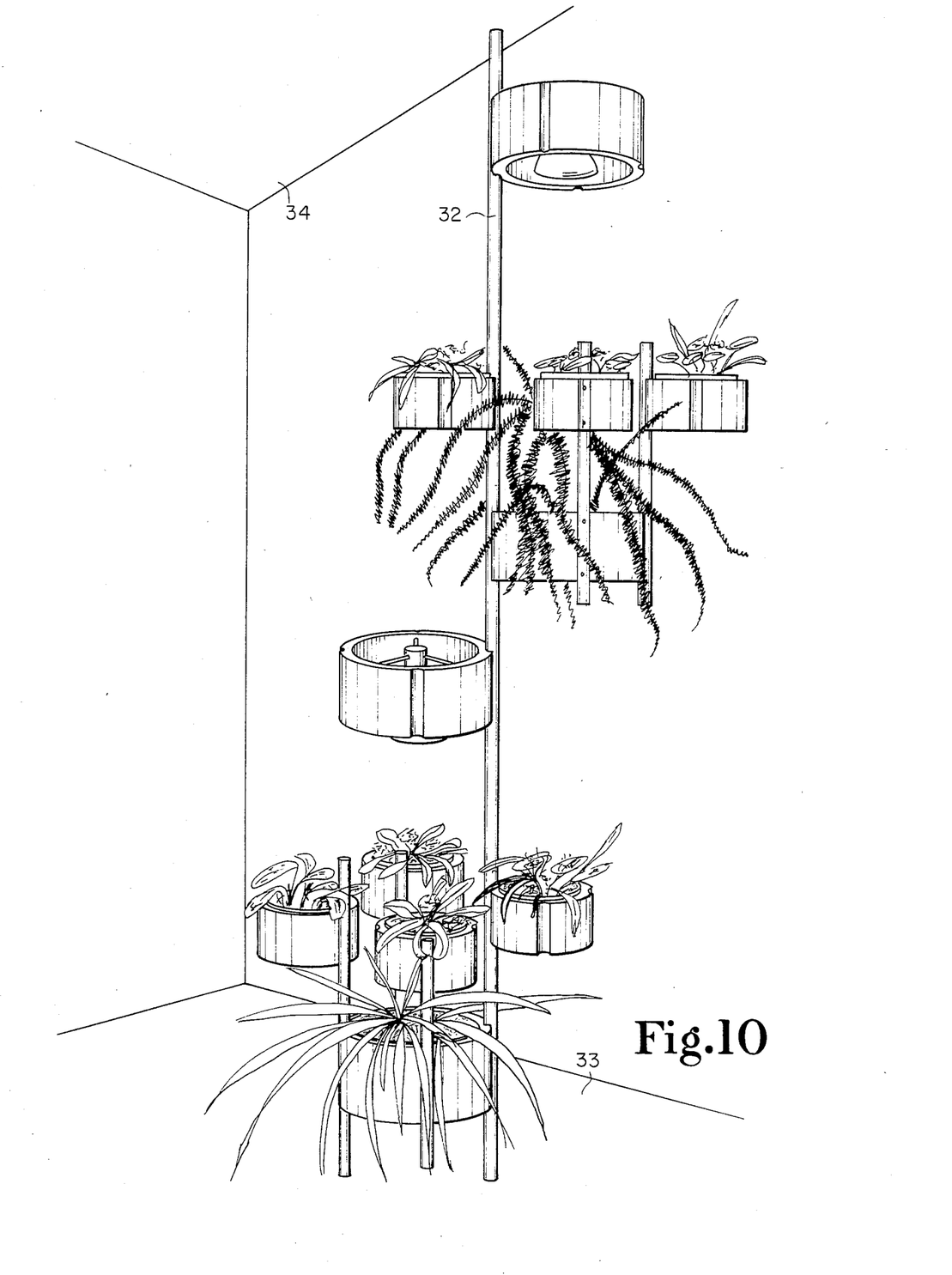
FIG. 10 is a perspective view illustrating an embodiment of the planter module system of the present invention supported by an adjustable length pole.
Figure 11:
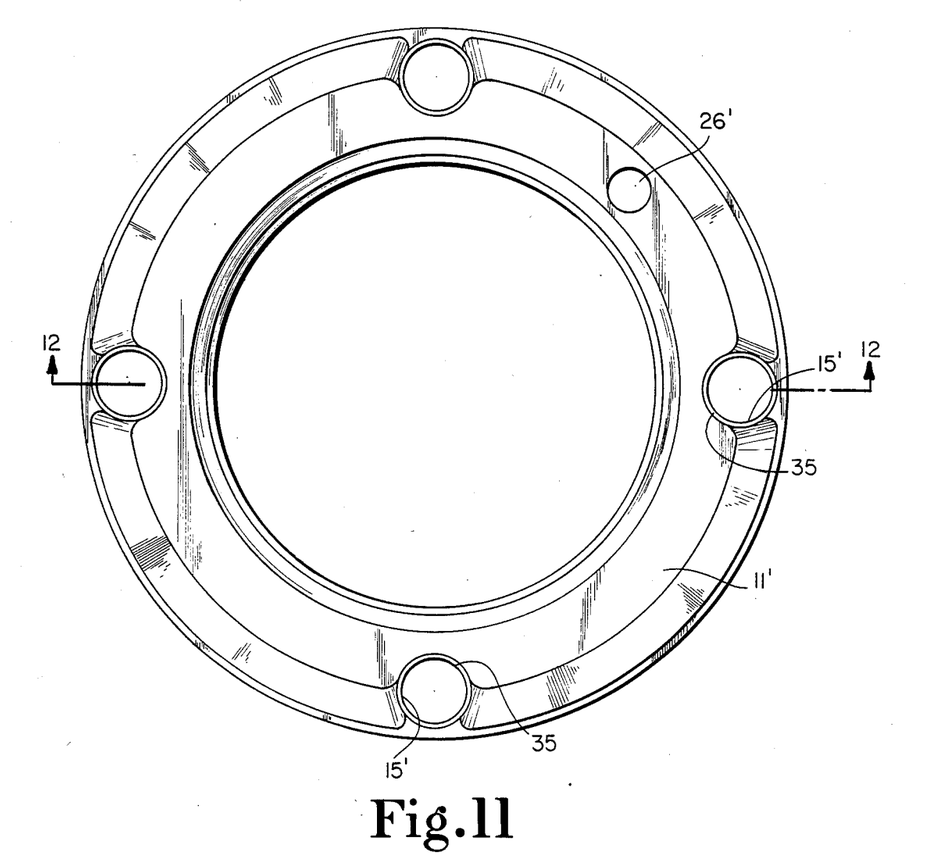
FIG. 11 is a plan view of an alternative embodiment of the pot housing of the present invention.
Figure 12:
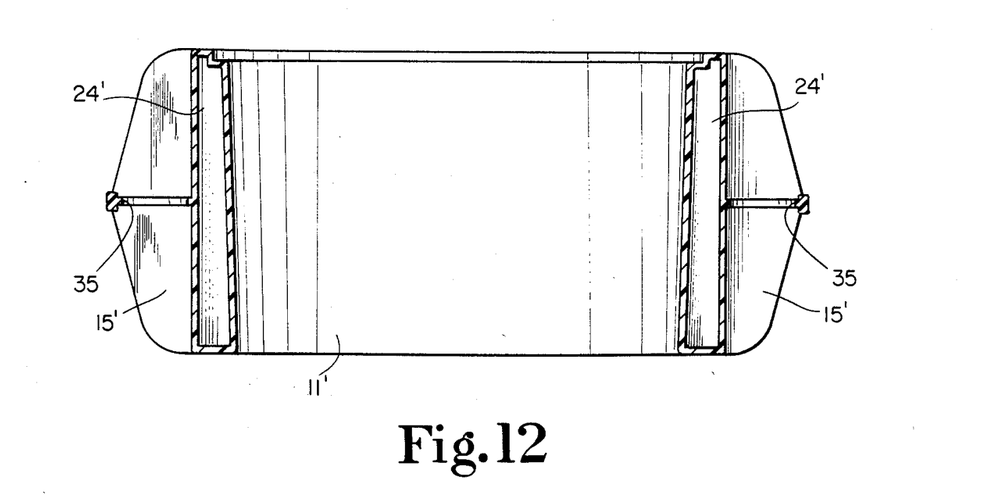
FIG. 12 is a section view of the FIG. 11 pot housing taken along line 12—12.
Figure 13:
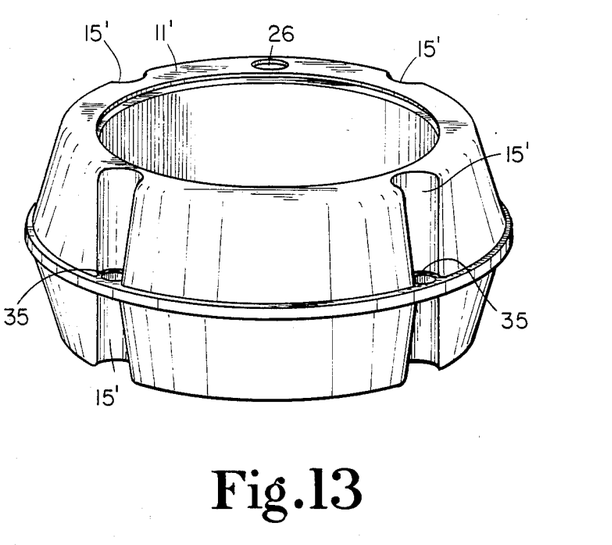
FIG. 13 is a perspective view of the pot housing of FIG. 11.
Figure 14:
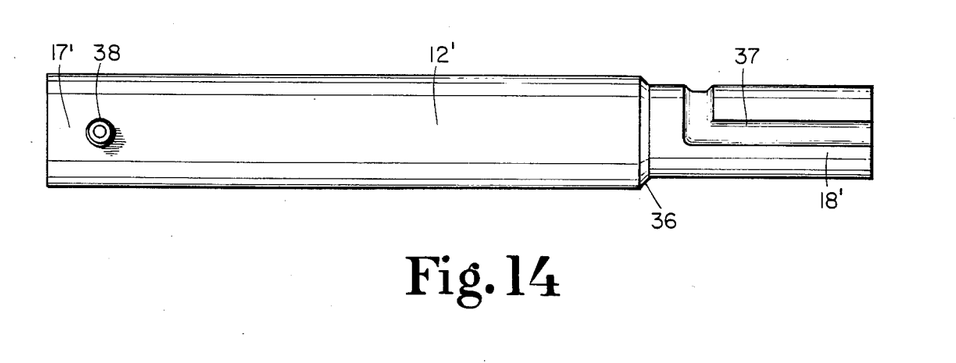
FIG. 14 is an elevation view partially in section of an alternative embodiment of the connecting member of the present invention adapted for use with the FIG. 11 pot housing.

In the embodiments shown in FIGS. 9 and 10, two additional methods of support are illustrated. It may be readily obvious to one skilled in the art that other types of support means could be used to provide suitable support for the modular planter system without departing from the spirit of the invention. In FIG. 9, the modular planter system includes base 31 which provides a floor support means. In FIG. 10, the modular planter system includes an adjustable length pole 32 which presses firmly against floor 33 and ceiling 34 to provide stability and support. Pole 32 may be any conventionally well known type such as, for example, is disclosed in U.S. Pat. No. 3,018,898 to Frazelle.

FIGS. 11–14 depict an alternative embodiment of planter module 10 which eliminates the need for bolting the connecting members 12 to their respective pot housings 11, thus providing an easier to assemble module planter system.

In this alternative preferred embodiment, primed numerals are used whenever elements therein correspond to elements in the previous preferred embodiment. Pot housing 11' includes a series of four equally radially spaced vertical channels 15' which are slightly different in shape from the recesses 15 in the previous embodiment in that channels 15' are totally enclosed along their central region. Connecting members 12' are received vertically and mated together within channels 15'. Each channel 15' defines an annular flange 35 which provides support for pot housing 11' on shoulder 36 of a connecting member 12' received within channel 15'. Male end 18' of connecting member 12' is sized to be received through the portion of channel 15' defined by annular flange 35. In order to mate two connecting members 12' within one of channels 15' of pot housing 11', it is merely necessary to insert a connecting member 12' within channel 15' so that the male end 18' extends upwardly through annular flange 35 and within channel 15'. Shoulder 36 serves to stop further progress of connecting member 12' through channel 15'. Another connecting member 12' may then be attached in male-female fashion within channel 15' by inserting female end 17' downwardly within channel 15' until it contacts the upward facing surface of annular flange 35. It should be readily apparent that mating of two connecting members 12' within one of channels 15' may also be accomplished by reversing the vertical orientation of the connecting members 12' so that the male end 18' of one connecting member extends downwardly through annular flange 35. Thus, annular flange 35 serves to prevent pot housing 11' from sliding vertically up or down along mated connecting members 12' and further provides an easy to assemble means for interlocking pot housing 11' with connecting members 12'. Connecting members 12' are provided with an L-shaped locking groove 37 along male end 18' and a projection 38 extending inwardly from the external surface of female end 17'. Projection 38 is adapted to be received within groove 37 to vertically lock connecting members 12'.

Thus, a modular planter system is described which offers great versatility in forming spatial arrangements and yet which is also easily assembled into any desired spatial arrangement. Each potted plant may be rotated within its respective housing and individual pot housings may be rotated by loosening the necessary set screws and turning their respective connecting members.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A modular planter system, comprising:
    a plurality of pot housings, each of said pot housings having an open bottom and each of said pot housings defining a plurality of circumferentially spaced-apart mounting locations; and
    a plurality of vertically disposed connecting members interconnecting said pot housings along a plurality of spaced-apart vertical axes, at least two of said plurality of pot housings vertically spaced-apart by said connecting members, each of said circumferentially spaced-apart mounting locations defining a vertical channel sized to receive therein a corresponding one of said connecting members, said connecting members providing interconnection of said pot housings in any radial orientation about said vertical axes.

2. The system of claim 1 wherein at least one of said pot housings receives therein a light fixture and said light fixture directs artificial light through said open bottom towards one or more plants contained within another of said pot housings.

3. A modular planter system, comprising:
    a plurality of pot housings, each of said pot housings having an open bottom and each of said pot housings defining at least four circumferentially spaced-apart mounting locations; and
    a plurality of vertically disposed connecting members interconnecting said pot housings along a plurality of spaced-apart vertical axes, at least two of said plurality of pot housings vertically spaced-apart by said connecting members, each of said circumferentially spaced-apart mounting locations defining a vertical channel sized to receive therein a corresponding one of said connecting members, said connecting members providing interconnection of said pot housings in any radial orientation about said vertical axes.

4. A modular planter system, comprising:
a plurality of pot housings, each of said pot housings defining a plurality of spaced-apart mounting locations; and
a plurality of vertically disposed connecting members interconnecting said pot housings along a plurality of spaced-apart vertical axes, each of said connecting members having male and female ends for mating to the corresponding male or female end of another similarly formed connecting member, at least two of said plurality of pot housings vertically spaced-apart by said connecting members, each of said spaced-apart mounting locations defining a vertical channel sized to receive therein a corresponding one of said connecting members, each of said spaced-apart mounting locations having an annular flange further defining said vertical channel and receiving therethrough the male end of one of said connecting members, said connecting members providing interconnection of said pot housings in any radial orientation about said vertical axes.

* * * * *